US012304584B2

United States Patent
Martínez Guillén et al.

(10) Patent No.: US 12,304,584 B2
(45) Date of Patent: May 20, 2025

(54) REAR SUSPENSION DEVICE, SYSTEM AND METHOD FOR A BICYCLE

(71) Applicant: Francisco Sanchez Soler, Alicante (ES)

(72) Inventors: Manuel Martínez Guillén, Alicante (ES); Francisco Martínez Femenía, Alicante (ES); Moisés Mas Rocamora, Alicante (ES); Álvaro Gómez Andrade, Alicante (ES); Elad Rodríguez Álvaro, Alicante (ES)

(73) Assignee: Francisco Soler, Alicante (ES)

( * ) Notice: Subject to any disclaimer, the term of this patent is extended or adjusted under 35 U.S.C. 154(b) by 339 days.

(21) Appl. No.: 18/017,611

(22) PCT Filed: Jul. 23, 2021

(86) PCT No.: PCT/EP2021/070630
§ 371 (c)(1),
(2) Date: Jan. 23, 2023

(87) PCT Pub. No.: WO2022/018241
PCT Pub. Date: Jan. 27, 2022

(65) Prior Publication Data
US 2023/0271663 A1  Aug. 31, 2023

(30) Foreign Application Priority Data

Jul. 24, 2020 (EP) ..................... 20020336

(51) Int. Cl.
*F16H 7/00* (2006.01)
*B62J 45/413* (2020.01)
(Continued)

(52) U.S. Cl.
CPC ............. *B62J 45/413* (2020.02); *B62J 45/42* (2020.02); *B62J 50/21* (2020.02); *B62K 3/02* (2013.01);
(Continued)

(58) Field of Classification Search
CPC ........... G01D 5/145; F16H 7/00; B62J 45/413
See application file for complete search history.

(56) References Cited

U.S. PATENT DOCUMENTS 10,094,683 B1   10/2018  Przykucki et al.
2011/0202236 A1* 8/2011  Galasso ............... B62K 25/286
                                                              701/37
(Continued)

FOREIGN PATENT DOCUMENTS

DE   202013008313 U1   10/2013
EP      3095682 A1   11/2016

OTHER PUBLICATIONS

Tyler Benedict; "Suspension Setup Series #1—Set your SAD Properly", www.bikrumor.com; Jul. 24, 2014; Retrieved from the internet: URL:https://web.archive.org/web/20140729163127/https://bikerumor.com/2014/07/24/suspension-setup-series-1-set-your-sag-properly/.

(Continued)

Primary Examiner — Alesa Allgood
(74) Attorney, Agent, or Firm — Farber LLC; Jonathan Winter

(57) ABSTRACT

Rear suspension device for a bicycle with three pivots, each with an axis of rotation an axial compression shock absorber, a linkage unit, a sensor unit and a magnet. The axes of rotation are parallel to each other and the axial compression shock absorber has a first end attached to the first pivot and a second end attached to the second pivot. The linkage unit is attached to the second pivot and the third pivot and rotates about the second and third axis of rotation. The sensor unit is on a surface of the linkage unit and comprises a Hall-effect sensor located in a plane perpendicular to the third axis of rotation and located at a distance d1 from the third axis of rotation. The first magnet is: a cylindrical or cylindrical shell magnet having an axis of rotational symmetry which is (Continued)

perpendicular to the parallel faces thereof; or a prism-shaped magnet comprising two polygonal parallel faces and an axis of rotational symmetry which is perpendicular to said parallel faces. The direction of the magnetic moment of the first magnet is perpendicular to said axis of rotational symmetry, and the first magnet is attached to the third pivot. The third axis of rotation and the axis of rotational symmetry of said first magnet are aligned. A distance d2 between said sensor unit and said magnet, and d1 is between 0.1 mm and 50 mm and d2 is between 0.01 mm and 50 mm.

18 Claims, 11 Drawing Sheets

(51) Int. Cl.
*B62J 45/42* (2020.01)
*B62J 50/21* (2020.01)
*B62K 3/02* (2006.01)
*B62K 25/08* (2006.01)
*B62K 25/28* (2006.01)
*G01D 5/14* (2006.01)

(52) U.S. Cl.
CPC ............ *B62K 25/08* (2013.01); *B62K 25/286* (2013.01); *G01D 5/145* (2013.01)

(56) References Cited

U.S. PATENT DOCUMENTS

| | | |
|---|---|---|
| 2015/0073657 A1 | 3/2015 | Galasso et al. |
| 2019/0039680 A1 | 2/2019 | Angell |
| 2019/0346004 A1 | 11/2019 | Higgins et al. |
| 2020/0079461 A1 | 3/2020 | Przykucki |
| 2020/0108884 A1 | 4/2020 | Przykucki et al. |

OTHER PUBLICATIONS

Written Opinion and International search Report for Application No. PCT/EP2021/070630 dated Oct. 21, 2021.

* cited by examiner

A.

B.

REAR SUSPENSION DEVICE, SYSTEM AND METHOD FOR A BICYCLE

FIELD OF THE INVENTION

The present invention relates to the field of bicycle technology, in particular technology for, or for use with, the rear suspension of bicycles.

BACKGROUND OF THE INVENTION

Bicycles which comprise rear and/or front suspension devices (suspension of the rear and/or front wheel, respectively) require adjustment of the suspension so as to optimize sag. Sag is required for the wheels to conform to the contour and shape of protrusions or depressions in the terrain over which the bicycle is ridden, while at the same time providing shock absorption to the user. If the bicycle suspension has excessive sag, shock absorption will be insufficient, and conversely if the bicycle suspension has insufficient sag, loss of traction occurs.

With a view to optimizing the adjustment of the suspension sag, electronic means for measuring sag of the rear and/or front suspension have been developed.

However, measurement of the sag is not reliable because the rear axle travels a non-linear path when a load (force) is applied thereto. Said path is at a minimum a simple arc when force is solely applied to the rear suspension system, but in bicycles which additionally comprise front suspension, or in bicycles which comprise a rear suspension system other than a classic single-pivot suspension, the path (coupler curve) through which the rear axle of the rear wheel of the bicycle travels is a complex curve, rendering accurate measurement of the distance of the path through which the rear axle of the rear wheel of the bicycle travels very difficult. This means that accurate adjustment of the suspension, and hence sag, is likewise fraught with error.

Therefore, there is a need for means for precise measurement of the path through which the rear axle of the rear wheel of the bicycle travels and, thus, for accurately classifying a rear shock absorber as correctly or incorrectly adjusted for a user, in order that the suspension can be correctly adjusted as required.

SUMMARY OF THE INVENTION

The present invention relates to a rear suspension device for a bicycle, wherein said device comprises:
(a) a first pivot (1) having a first axis of rotation, a second pivot (2) having a second axis of rotation, and a third pivot (3) having a third axis of rotation;
(b) a first axial compression shock absorber (7);
(c) a linkage unit (6);
(d) a first sensor unit (5); and
(e) a first magnet (10)
wherein
said first axis of rotation, said second axis of rotation and said third axis of rotation are parallel;
said first axial compression shock absorber comprises a first end and a second end, wherein said first end is attached to said first pivot and said second end is attached to said second pivot; and
said linkage unit is attached to said second pivot and said third pivot and rotates about said second axis of rotation and said third axis of rotation;
characterized in that
said first sensor unit is located on a surface of said linkage unit and comprises at least one Hall-effect sensor located in a plane perpendicular to the third axis of rotation, wherein each Hall-effect sensor is located at a distance d1 from said third axis of rotation;
said first magnet is:
a cylindrical or cylindrical shell magnet having an axis of rotational symmetry which is perpendicular to the parallel faces thereof; or
a prism-shaped magnet comprising two polygonal parallel faces and an axis of rotational symmetry which is perpendicular to said parallel faces;
wherein the direction of the magnetic moment of said first magnet is perpendicular to said axis of rotational symmetry, wherein said first magnet is attached to said third pivot;
wherein the third axis of rotation and the axis of rotational symmetry of said first magnet are aligned and wherein there is a distance d2 between said first sensor unit and said first magnet, and wherein:
d1 is between 0.1 mm and 50 mm, and
d2 is between 0.01 mm and 50 mm.

In addition, the present invention relates to a bicycle suspension system comprising the rear suspension device of the present invention, as described herein, in combination with a front suspension device for a bicycle and an electronic circuit, wherein said electronic circuit monitors the displacement measured by said rear suspension device and said front suspension device.

Moreover, the present invention relates to a bicycle comprising the rear suspension device of the present invention, as described herein, or the bicycle suspension system of the present invention, as described herein.

Furthermore, the present invention relates to a method for classifying the first shock absorber of a rear suspension device of the present invention, as described herein, in a bicycle, as correctly or incorrectly adjusted for the user, wherein said method comprises the following steps:
(a) determining the offset angle, $A_{off}$, by measuring the angular displacement of the first sensor unit with respect to the first magnet when the first axial compression shock absorber comprised in the rear suspension device, is fully compressed;
(b) determining the maximum angular displacement, $A_{max}$, by measuring the angular displacement of the first sensor unit with respect to the first magnet when the first shock absorber is fully extended;
(c) determining the relative maximum angular displacement, $A_{maxrel}$, by subtracting the offset angle, $A_{off}$, determined in step (a) from the maximum angular displacement, $A_{max}$, measured in step (b);
(d) converting the relative maximum angular displacement, $A_{maxrel}$, into a total travel distance, T; and
(e) measuring the angular displacement, A, of the first sensor unit with respect to the first magnet when the user is mounted on said bicycle;
(f) determining the relative angular displacement, $A_{rel}$, by subtracting the offset angle, $A_{off}$, determined in step (a) from the angular displacement, A, measured in step (e);
(g) converting the relative angular displacement, $A_{rel}$, into a linear displacement value, L;
(h) classifying said first shock absorber as:
incorrectly adjusted for said user when L is less than or equal to a value L1 or greater than or equal to a value L2; or
correctly adjusted for said user when L is between L1 and L2, wherein:
L is the linear displacement, $L_{axle}$, of the rear axle of the bicycle;
T is the total travel distance, $T_{axle}$, of the rear axle of the bicycle;
L1 is a value selected from between 10% and 50% of $T_{axle}$; and
L2 is a value selected from between 20% and 50% of $T_{axle}$;
or wherein
L is the linear displacement, Lshock, of the first shock absorber;
T is the total travel distance, Tshock, of the first shock absorber;
L1 is a value selected from between 10% and 50% of Tshock; and
L2 is a value selected from between 20% and 50% of Tshock,
and wherein L1 is at least 0.1% less than L2.

The present invention also relates to a rear suspension device for a bicycle, wherein said device comprises:
(a) a first pivot (1) having a first axis of rotation, a second pivot (2) having a second axis of rotation, and a third pivot (3) having a third axis of rotation;
(b) a first axial compression shock absorber (7);
(c) a linkage unit (6);
(d) a first sensor unit (5); and
(e) a first magnet (10)
wherein
said first axis of rotation, said second axis of rotation and said third axis of rotation are parallel;
said first axial compression shock absorber comprises a first end and a second end, wherein said first end is attached to said first pivot and rotates about said first axis of rotation and said second end is attached to said second pivot and rotates about said second axis of rotation; and
said linkage unit is attached to said second pivot and said third pivot and rotates about said second axis of rotation and said third axis of rotation;
characterized in that
said first sensor unit is located on a surface of said linkage unit and comprises four Hall-effect sensors located in a plane perpendicular to the third axis of rotation, wherein each Hall-effect sensor is located at a distance d1 from said third axis of rotation;
said first magnet is a cylindrical or cylindrical shell magnet having an axis of rotational symmetry which is perpendicular to the parallel faces thereof;
wherein the direction of the magnetic moment of said first magnet is perpendicular to said axis of rotational symmetry, wherein said first magnet is attached to and embedded in said third pivot, and the face of said magnet which is closest to said first sensor unit is flush with the end surface of said third pivot;
wherein the third axis of rotation and the axis of rotational symmetry of said first magnet are aligned and wherein there is a distance d2 between said first sensor unit and said first magnet, and wherein:
d1 is between 0.1 mm and 10 mm, and
d2 is between 0.01 mm and 10 mm,
wherein the first pivot is for direct or indirect attachment to a lower linkage unit which is attached to said bicycle frame, and the third pivot is for direct or indirect attachment to said bicycle frame.

DETAILED DESCRIPTION OF THE INVENTION

Figure 1:
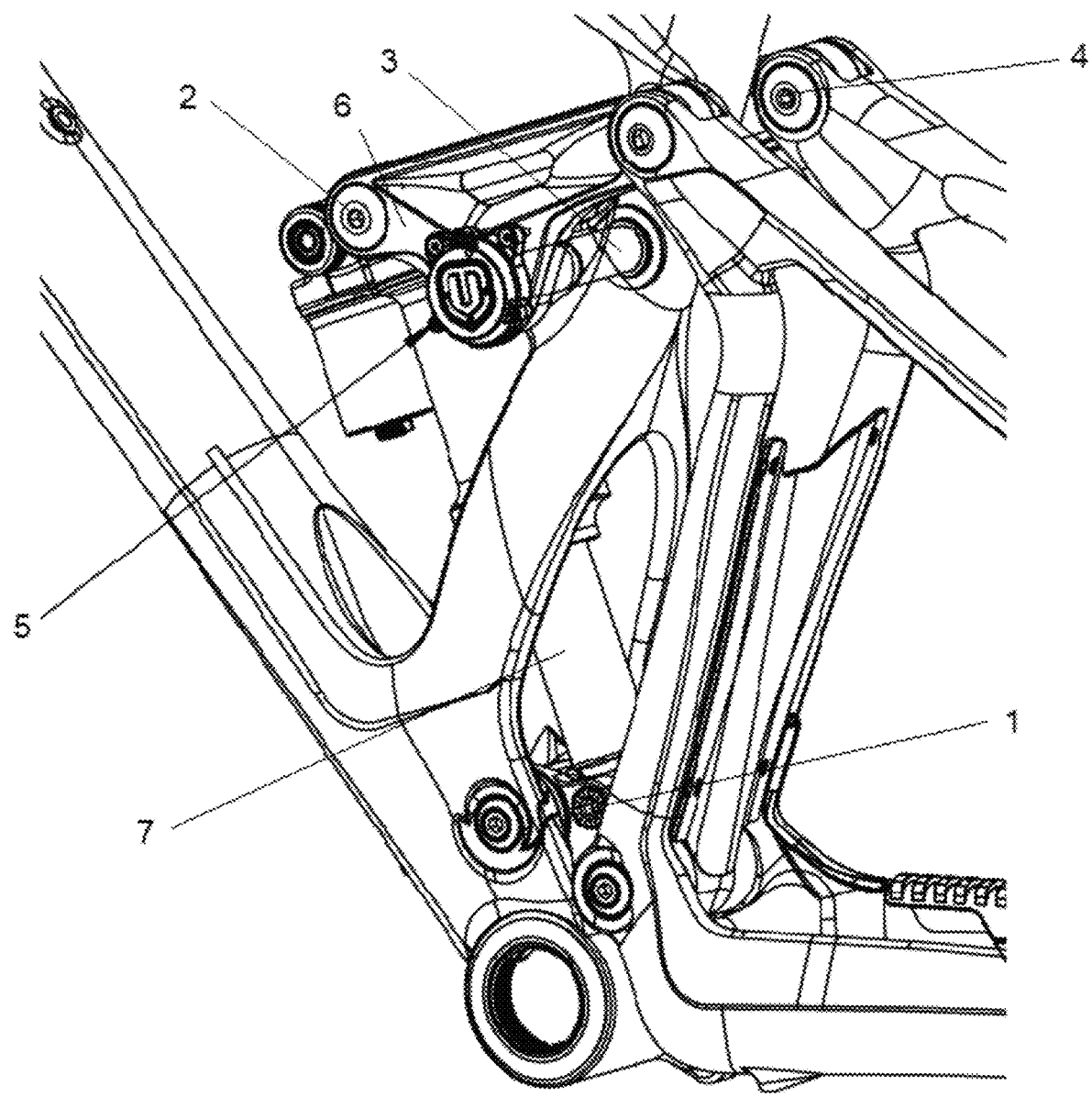
FIG. 1. Perspective view of an embodiment of a rear suspension device of the present invention, located in situ in a MDFYC (Foxy Carbon) bicycle frame, showing: first pivot (1), second pivot (2), third pivot (3), fourth pivot (4), first sensor unit (5), linkage unit (6) and first axial compression shock absorber (7).

The present invention relates to a rear suspension device for a bicycle. Thus, the rear suspension device, when installed in a bicycle, provides suspension (shock absorption/damping) to the rear wheel of said bicycle. Said rear suspension device reduces the perceived impact experienced by the rider through contact of the rear wheel with protrusions/depressions in the path over which the bicycle is ridden.

Said bicycle (bike) is preferably any type of two-wheeled vehicle, whether human-powered and/or motor-powered (e.g. electric). More preferably, said bicycle is a mountain bicycle (MTB, mountain bike, all-terrain bicycle, off-road bicycle), a fatbike, a recumbent bicycle or a cruiser bicycle. Still more preferably, said bicycle is a mountain bicycle selected from the group consisting of a downhill bicycle, a freeride bicycle, a trail bicycle, a cross-country bicycle, an enduro bicycle, an all-mountain bicycle or a slope-style bicycle. Even more preferably, said bicycle is a mountain bicycle having wheels of an inside rim diameter of 622 mm (700 C) or 584 mm (650B) according to ISO 5775-1:1997 or ISO 5775-2:1996.

Said rear suspension device of the present invention comprises:
(a) a first pivot (1) having a first axis of rotation, a second pivot (2) having a second axis of rotation, and a third pivot (3) having a third axis of rotation;
(b) a first axial compression shock absorber (7);
(c) a linkage unit (6);
(d) a first sensor unit (5); and
(e) a first magnet (10),
wherein:
said first axis of rotation, said second axis of rotation and said third axis of rotation are parallel;
said first axial compression shock absorber comprises a first end and a second end, wherein said first end is attached to said first pivot and said second end is attached to said second pivot; and
said linkage unit is attached to said second pivot and said third pivot and rotates about said second axis of rotation and said third axis of rotation.

Said first axial compression shock absorber (7) is a mechanical and/or hydraulic device for absorbing or damping a load (shock force) applied thereto. Preferably said first axial compression shock absorber comprises a first end and a second end, a damper and a spring. Said spring compresses under load, and the damper dissipates the energy stored in the spring, thereby regulating the rate at which the spring compresses and rebounds.

Figure 6:
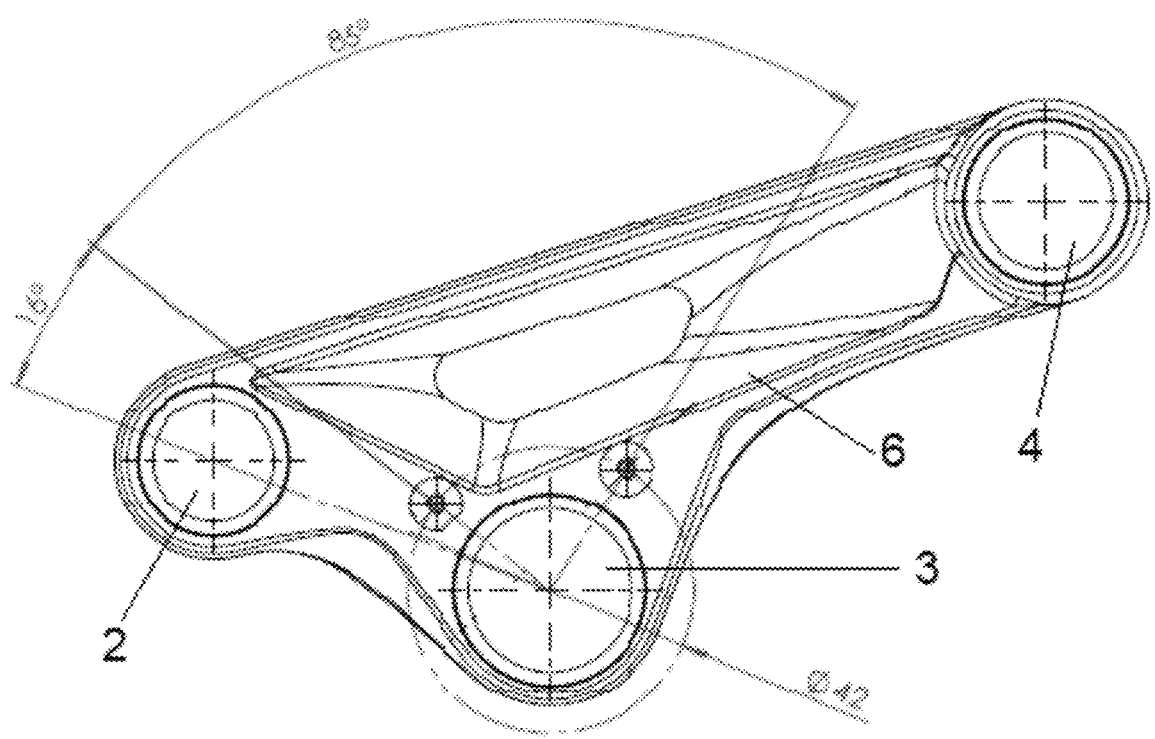
FIG. 6. Side view of the linkage unit (6) of an embodiment of a rear suspension device of the present invention, showing the second (2), third pivot (3) and fourth pivot (4).

Said linkage unit (6) is a bar which links the second pivot to the third pivot. Preferably said linkage unit is a lever which pivots about said second axis of rotation and said third axis of rotation, wherein said axes are fulcra. Thus, rotational force applied to said link about said third axis of rotation is converted into an arc force (approximating a linear force) at the second axis of rotation which is applied to the first axial compression shock absorber (7). One embodiment of the linkage unit (6) is shown in FIG. 6.

Thus, said rear suspension device of the present invention is preferably configured for single-pivot suspension, multiple-pivot suspension or short-link four-bar suspension. Preferably, single-pivot suspension is selected from the group consisting of classic single-pivot suspension, linkage-driven single pivot suspension and split-pivot suspension, where there is only one pivot connecting the rear wheel to the main frame of the bicycle via a swingarm. Preferably said multiple-pivot suspension is selected from four-bar multiple-pivot suspension or equilink multiple-pivot suspension, where there is more than one pivot connecting the rear wheel to the main frame of the bicycle. More preferably, said multiple-pivot suspension is four-bar multiple-pivot suspension selected from the group consisting of Horst link suspension (as per the Horst Link suspension of Specialized) and FSR Suspension (as per the FSR suspension of Specialized, Cube and Scott or the Advanced Ride Technology suspension of Norco). Preferably said short-link four-bar suspension is selected from the group consisting of zero suspension (as per the Zero suspension system of Mondraker), virtual pivot point (VPP) suspension (as per the VPP suspension of Santa Cruz Bicycles), living link suspension (as per the Living Link suspension of Spot Bikes), DW-link suspension (as per the DW-link suspension of Ibis, Independent Fabrication, Turner Suspension Bicycles and Pivot Cycles), Maestro suspension (as per the Maestro suspension of Giant Bicycles), switch link suspension (as per the Switch link suspension of Yeti Cycles) and full floater suspension (as per the Full Floater suspension of Trek), where the rear triangle of comprising the chain-stays and seat-stays is a rigid unit that is attached to the connecting links of the short-link four-bar suspension. Even more preferably, said rear suspension device of the present invention is configured for zero suspension, where the first pivot is attached to a lower linkage unit and the second pivot is attached to the linkage unit (6), such that the first axial compression shock absorber (7) floats between the two linkage units thereof and is compressed from both ends.

Each pivot is an attachment for linking a part of said rear suspension device to another part thereof or to a part of said bicycle. Attachment may be direct, without any components between said part and said pivot, or indirect, with at least one component (e.g. a bushing or bearing) between said part and said pivot. By having an axis of rotation, each pivot is preferably also that about which rotation of a part of said rear suspension device or said bicycle is possible, depending on whether said part is able to rotate independently of said pivot or not. When said part is able to rotate independently of said pivot, rotation around both said pivot and its corresponding axis of rotation occurs, and when said part is not able to rotate independently of said pivot (for example, due to being immovably attached thereto), rotation around its corresponding axis of rotation occurs. Thus, in a preferred embodiment of the rear suspension device of the present invention, said first end of first axial compression shock absorber is attached to said first pivot and rotates about said first axis of rotation, and said second end of first axial compression shock absorber is attached to said second pivot and rotates about said second axis of rotation. Even more preferably, said first end of first axial compression shock absorber is attached to said first pivot and rotates about said first axis of rotation, said second end of first axial compression shock absorber and said linkage unit are independently attached to said second pivot and independently rotate about said second axis of rotation, and said linkage unit is attached to said third pivot and rotates about said third axis of rotation. Still more preferably, said first end of the first axial compression shock absorber is attached to said first pivot and rotates about said first axis of rotation, said second end of the first axial compression shock absorber and said linkage unit are independently attached to said second pivot and independently rotate about said second axis of rotation, and said linkage unit is attached to said third pivot and said fourth pivot and rotates about said third and fourth axes of rotation. In addition, said bicycle frame may be also attached to said first and third pivots, and rotate about said first and third axes of rotation relative to the first axial compression shock absorber and linkage unit, respectively. However, depending on the way in which the rear suspension device is configured, the rotation about any given axis of rotation during use of said device may be negligible, if at all existent.

In a preferred embodiment of the rear suspension device of the present invention, said linkage unit (6) additionally comprises a fourth pivot (4) having a fourth axis of rotation parallel to said first axis of rotation, said second axis of rotation and said third axis of rotation, and said linkage unit is additionally attached to and rotates about said fourth pivot. In a more preferred embodiment of the rear suspension device of the present invention:

said first and third pivots are for directly or indirectly attaching to the frame of said bicycle; and said fourth pivot is for directly or indirectly attaching to the rear wheel of said bicycle. These preferred and more preferred embodiments therefore encompass a rear suspension device which is configured for any of the aforementioned types of suspension other than classic single-pivot suspension.

Figure 2:
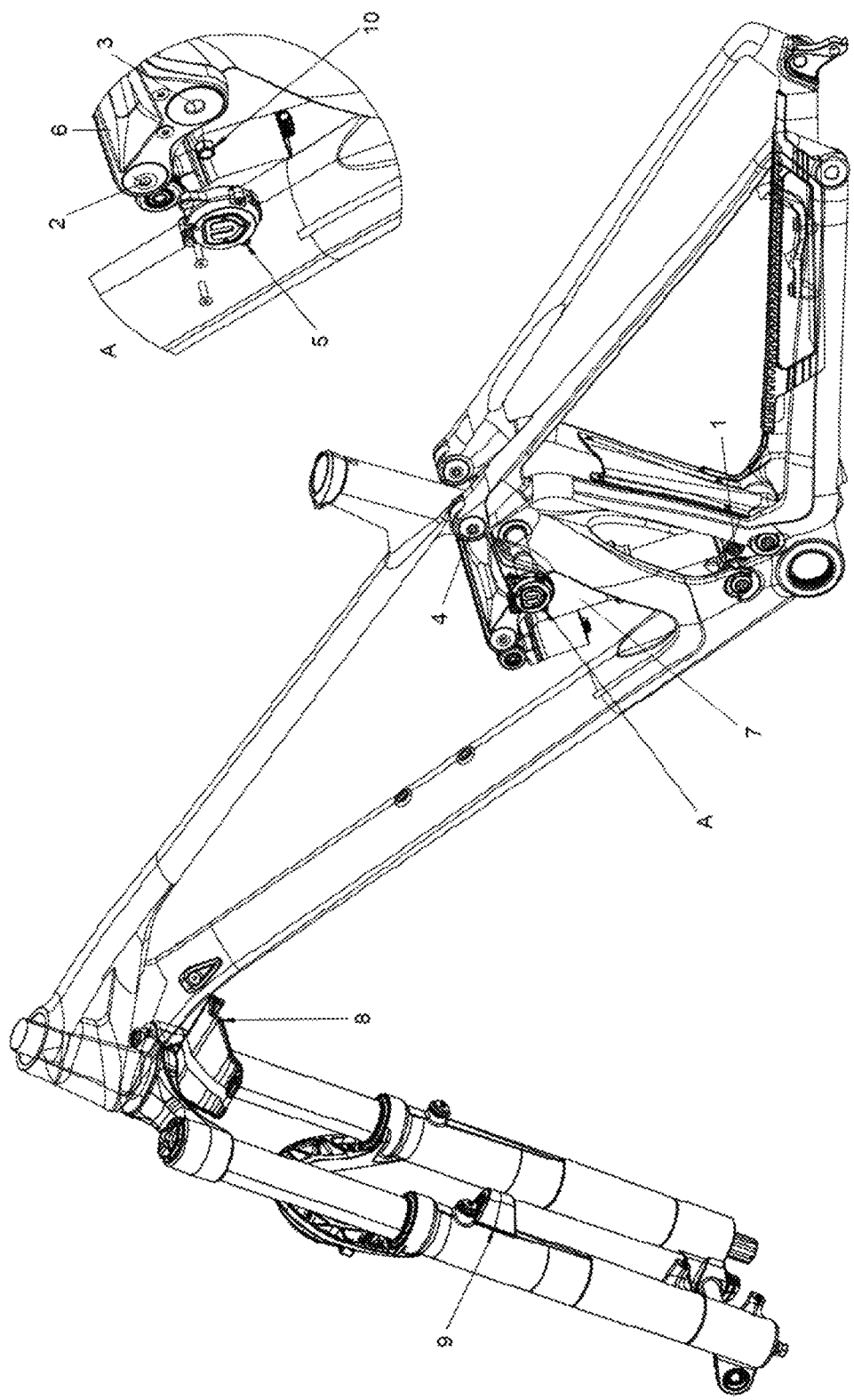
FIG. 2. Perspective view of an embodiment, together with exploded detail A, of a rear suspension device of the present invention, located in situ in a MDFYC (Foxy Carbon) bicycle frame, showing first pivot (1), second pivot (2), third pivot (3), fourth pivot (4), first sensor unit (5), linkage unit (6), first axial compression shock absorber (7), main board (8), housing for the second magnet (9) and first magnet (10).
Figure 3:
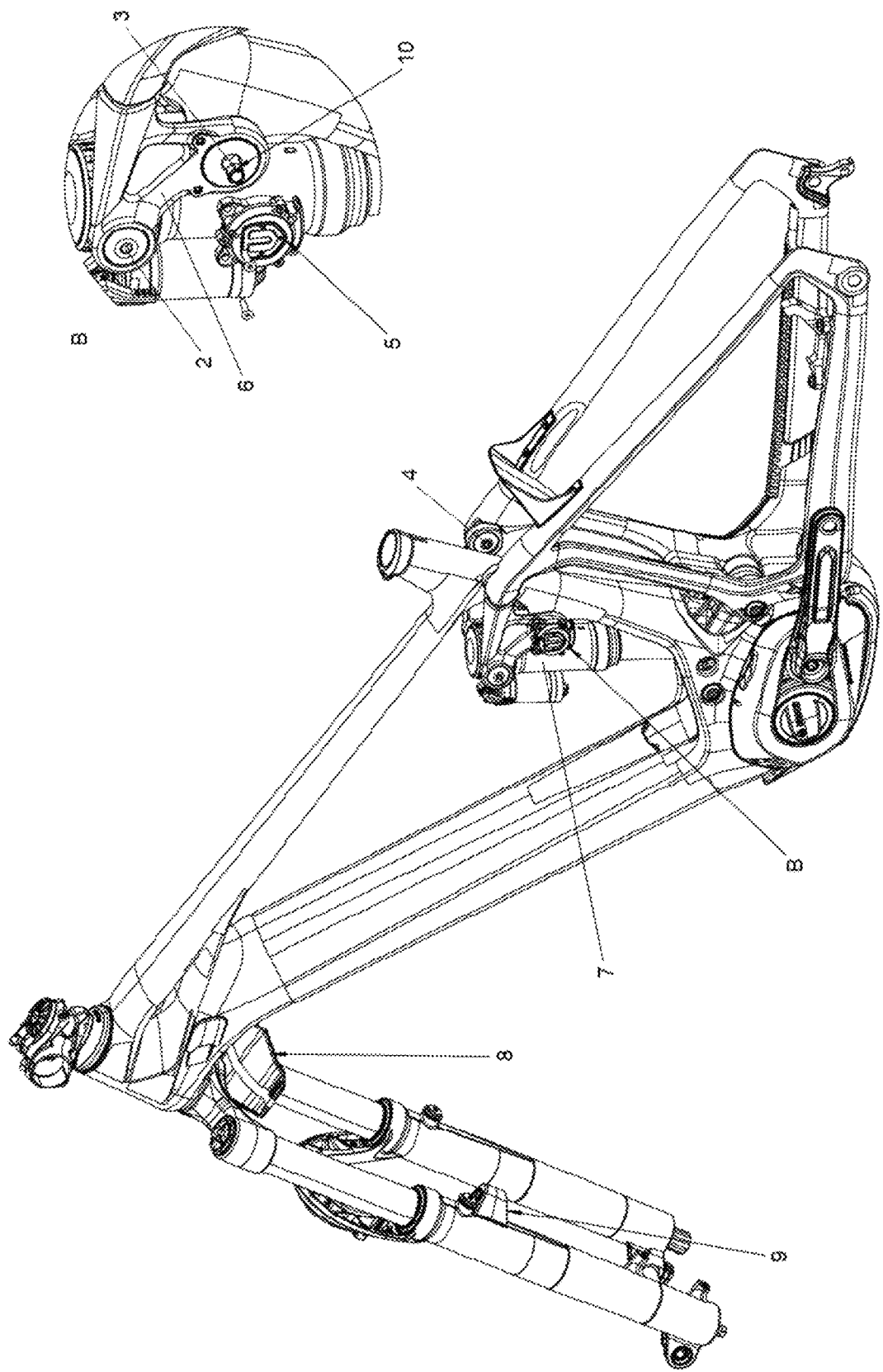
FIG. 3. Perspective view of an embodiment, together with exploded detail B, of a rear suspension device of the present invention, located in situ in a Crafty Carbon bicycle frame, showing: second pivot (2), third pivot (3), fourth pivot (4), first sensor unit (5), linkage unit (6), first axial compression shock absorber (7), main board (8), housing for the second magnet (9) and first magnet (10).

Said rear suspension device of the present invention is characterized in that said first sensor unit (5) is located on a surface of said linkage unit and comprises at least one Hall-effect sensor located in a plane perpendicular to the third axis of rotation, wherein each Hall-effect sensor is located at a distance d1 from said third axis of rotation;

said first magnet is:

a cylindrical or cylindrical shell magnet having an axis of rotational symmetry which is perpendicular to the parallel faces thereof; or a prism-shaped magnet comprising two polygonal parallel faces and an axis of rotational symmetry which is perpendicular to said parallel faces;

wherein the direction of the magnetic moment of said first magnet is perpendicular to said axis of rotational symmetry, wherein said first magnet is attached to said third pivot;

wherein the third axis of rotation and the axis of rotational symmetry of said first magnet are aligned and wherein there is a distance d2 between said first sensor unit and said first magnet, and wherein:

d1 is between 0.1 mm and 50 mm; and d2 is between 0.01 mm and 50 mm. Embodiments of the rear suspension device according to this configuration are shown in FIGS. 1, 2 and 3.

In an alternative embodiment:

said first sensor unit (5) is located on a surface of said linkage unit and comprises at least one Hall-effect sensor located in a plane perpendicular to the second axis of rotation, wherein each Hall-effect sensor is located at a distance d1 from said second axis of rotation;

said first magnet is:

a cylindrical or cylindrical shell magnet having an axis of rotational symmetry which is perpendicular to the parallel faces thereof; or a prism-shaped magnet comprising two polygonal parallel faces and an axis of rotational symmetry which is perpendicular to said parallel faces;

wherein the direction of the magnetic moment of said first magnet is perpendicular to said axis of rotational symmetry, wherein said first magnet is attached to said second pivot;

wherein the second axis of rotation and the axis of rotational symmetry of said first magnet are aligned and wherein there is a distance d2 between said first sensor unit and said first magnet, and wherein:

d1 is between 0.1 mm and 50 mm, and d2 is between 0.01 mm and 50 mm.

In another alternative embodiment:

said first sensor unit (5) is located on a surface of said linkage unit and comprises at least one Hall-effect sensor located in a plane perpendicular to the fourth axis of rotation, wherein each Hall-effect sensor is located at a distance d1 from said fourth axis of rotation;

said first magnet is:

a cylindrical or cylindrical shell magnet having an axis of rotational symmetry which is perpendicular to the parallel faces thereof; or a prism-shaped magnet comprising two polygonal parallel faces and an axis of rotational symmetry which is perpendicular to said parallel faces;

wherein the direction of the magnetic moment of said first magnet is perpendicular to said axis of rotational symmetry, wherein said first magnet is attached to said fourth pivot;

wherein the fourth axis of rotation and the axis of rotational symmetry of said first magnet are aligned and wherein there is a distance d2 between said first sensor unit and said first magnet, and wherein:

d1 is between 0.1 mm and 50 mm, and d2 is between 0.01 mm and 50 mm.

Figure 5:
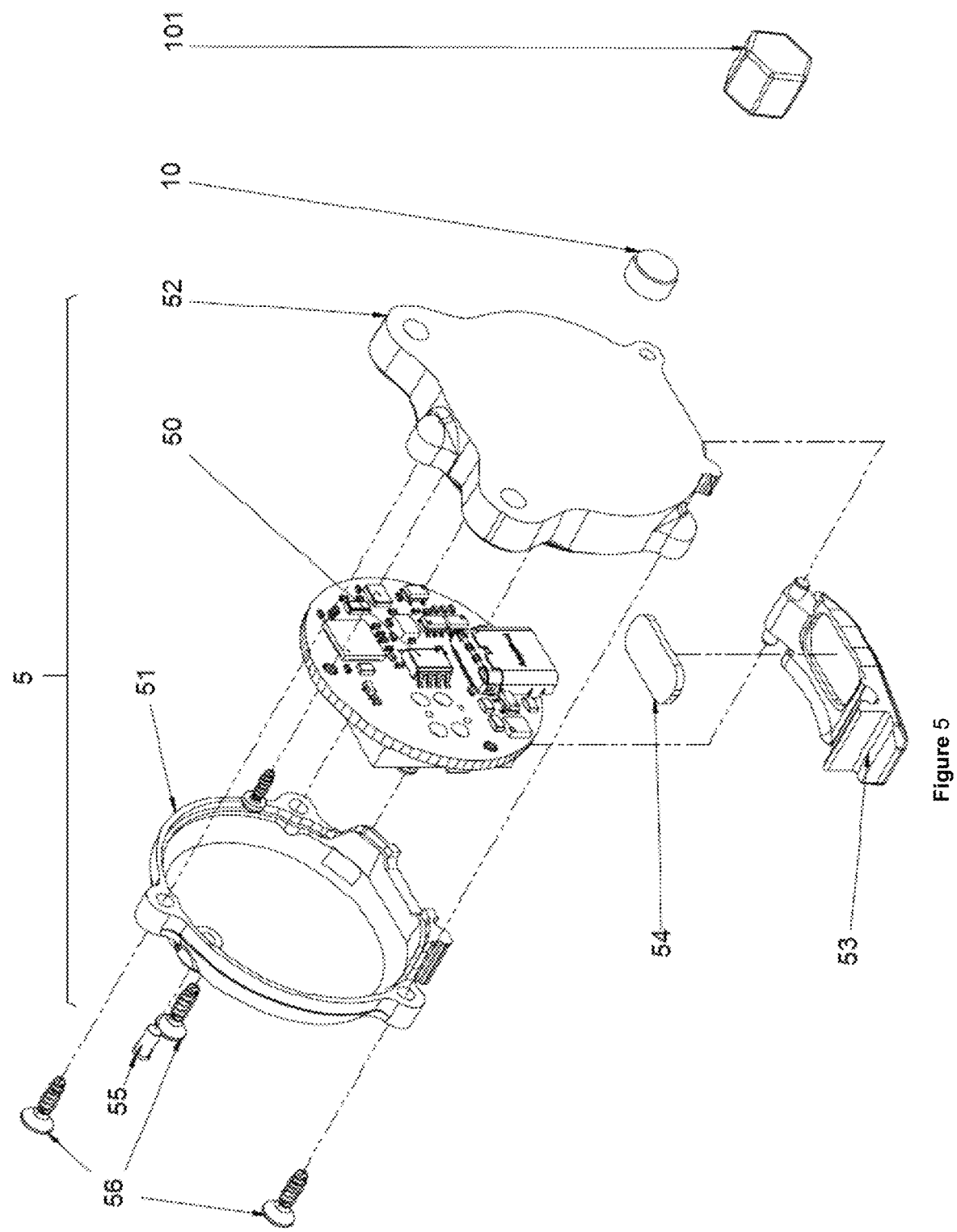
FIG. 5. Exploded perspective partial view of an embodiment of a rear suspension device of the present invention showing: first sensor unit (5) and first magnet (10), as well as sensor (50), first sensor capsule cap (51), first sensor capsule base (52), first sensor USB cover (53), first sensor USB rubber (54), first sensor LED lens (55), first sensor screws (56) and first magnet housing (101).

In a preferred embodiment of the present invention, said first sensor unit (5) comprises at least two Hall-effect sensors, more preferably four Hall-effect sensors. Thus, the first sensor unit is a magnetic rotary position sensor unit that is contactless insofar as each sensor measures changes in a magnetic field. By rotating the sensor unit relative to the first magnet, each sensor measures the change in the magnetic flux density which is converted to a linear output. In particular, the change in the magnetic flux density is measured as a change in voltage, current or resistance, preferably voltage, which can be used to calculate the relative angle of rotation. In an exemplified preferred embodiment of the present invention, the first sensor unit is an AS5600 12-Bit Programmable Contactless Potentiometer furnished by ams AG which comprises four Hall-effect sensors. Said exemplified preferred embodiment of the first sensor unit (5) is shown in FIG. 5.

In the present invention, said first magnet is:

a cylindrical or cylindrical shell (i.e. annular) magnet having an axis of rotational symmetry which is perpendicular to the parallel faces thereof; or a prism-shaped magnet comprising two polygonal parallel faces and an axis of rotational symmetry which is perpendicular to said parallel faces; or wherein the direction of the magnetic moment of said first magnet is perpendicular to said axis of rotational symmetry. Thus, the north pole and south pole of said first magnet are separated by a plane through said axis of rotational symmetry. When said magnet is a cylindrical or cylindrical shell magnet said magnet may be referred to as diametrically magnetized. Preferably, said first magnet is a cylindrical or cylindrical shell magnet, more preferably a cylindrical magnet.

Figure 4:
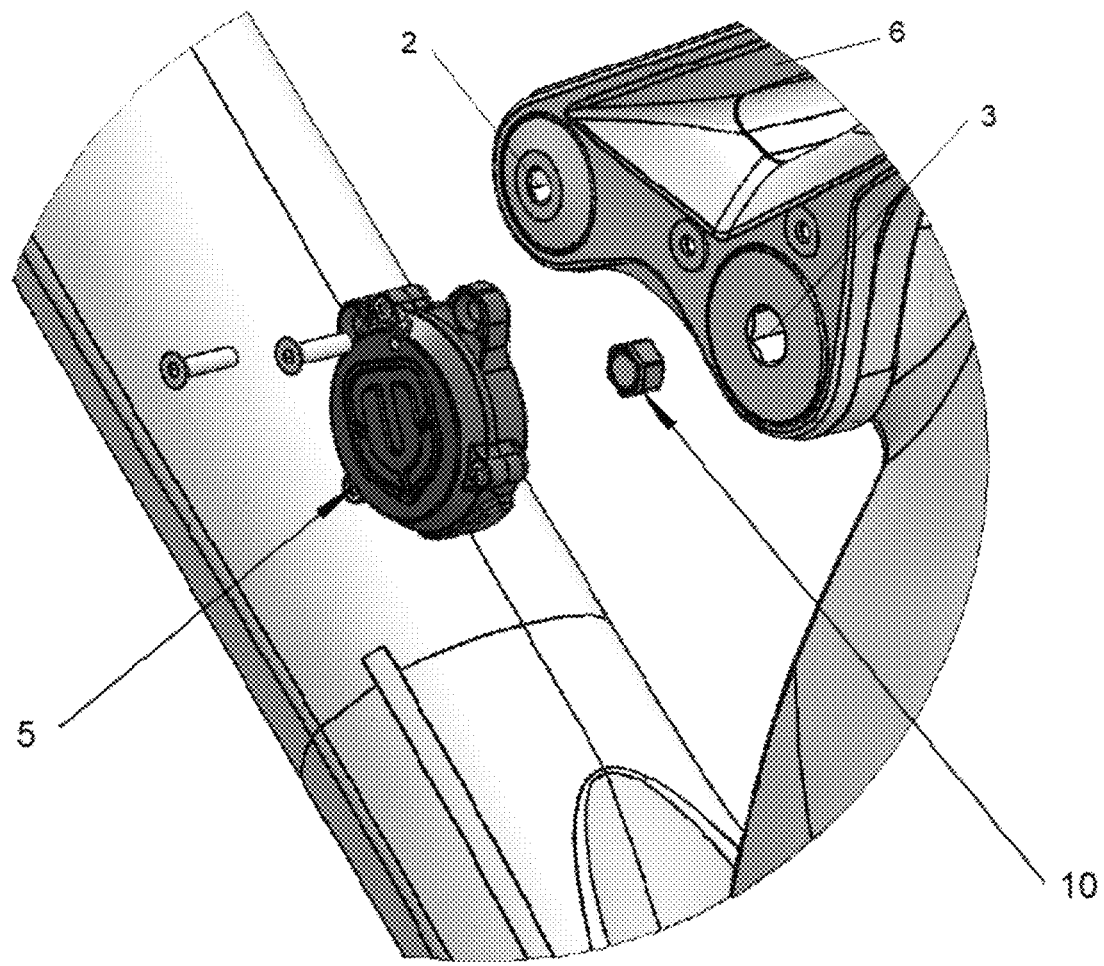
FIG. 4. Exploded perspective partial view of an embodiment of a rear suspension device of the present invention located in situ in a MDFYC (Foxy Carbon) bicycle frame showing: second pivot (2), third pivot (3), first sensor unit (5), linkage unit (6) and first magnet (10).

Said first magnet is attached to said third pivot, wherein the third axis of rotation and the axis of rotational symmetry of said first magnet are aligned (FIG. 4). Alternatively, said first magnet is attached to said second pivot, wherein the second axis of rotation and the axis of rotational symmetry of said first magnet are aligned. Alternatively, said first magnet is attached to said fourth pivot, wherein the fourth axis of rotation and the axis of rotational symmetry of said first magnet are aligned. Thus, the respective axis of rotation and the axis of rotational symmetry of said first magnet coincide. Preferably, said first magnet is attached to said respective pivot so that the parallel face of said first magnet that is exposed to the first sensor unit (5) either protrudes from or is flush with an end surface of said pivot. In a preferred embodiment of the rear suspension device of the present invention, said first magnet is embedded in said third pivot, and the face of said magnet which is closest to (i.e. exposed to) said first sensor unit (5) is flush with the end surface of said third pivot. In an exemplified even more preferred embodiment of the present invention, said first magnet is a cylindrical diametrically magnetized magnet which is embedded in a hexagonal prism-shaped cavity in the end surface of said third pivot and the parallel face of said first magnet that is exposed to the first sensor unit (5) is flush with said end surface of said third pivot.

Each Hall-effect sensor is located in the plane perpendicular to the axis of rotation of the pivot to which it is attached (i.e. a plane perpendicular to the axis of rotational symmetry of said first magnet) and at a distance d1 from said axis of rotation. In addition, said first sensor unit is located at a distance d2 from said first magnet. The skilled person will understand that the position of the first sensor unit (5) and, thus, each Hall-effect sensor comprised therein, relative to said magnet, and, hence, the values of the parameters d1 and d2, depends on the intensity of the magnetic field of said magnet, the shape and dimensions of said magnet, the magnetic properties of objects located in the vicinity of said magnet, and the number and sensitivity of the Hall-effect sensors, amongst other parameters. For example, a larger and stronger first magnet means d1 may be larger. In a particularly preferred embodiment, the pivot to which the first magnet is attached is made of a non-ferromagnetic material.

In the present invention, d1 is the same for each sensor and is between 0.1 and 50 mm, while d2 is between 0.01 mm and 50 mm. Preferably, d1 is between 0.1 and 20 mm, and d2 is between 0.05 and 20 mm, more preferably d1 is between 0.15 and 10 mm, and d2 is between 0.1 and 10 mm. In a preferred embodiment of the rear suspension device of the present invention, d1 is less than or equal to the longest dimension of the parallel faces of said first magnet, and d2 is less than 5 mm.

In a particularly preferred embodiment of the present invention, the rear suspension device is for a bicycle, wherein said device comprises:
(a) a first pivot (1) having a first axis of rotation, a second pivot (2) having a second axis of rotation, and a third pivot (3) having a third axis of rotation;
(b) a first axial compression shock absorber (7);
(c) a linkage unit (6);
(d) a first sensor unit (5); and
(e) a first magnet (10)
wherein
said first axis of rotation, said second axis of rotation and said third axis of rotation are parallel;
said first axial compression shock absorber comprises a first end and a second end, wherein said first end is attached to said first pivot and rotates about said first axis of rotation and said second end is attached to said second pivot and rotates about said second axis of rotation; and
said linkage unit is attached to said second pivot and said third pivot and rotates about said second axis of rotation and said third axis of rotation;
characterized in that
said first sensor unit is located on a surface of said linkage unit and comprises four Hall-effect sensors located in a plane perpendicular to the third axis of rotation, wherein each Hall-effect sensor is located at a distance d1 from said third axis of rotation;
said first magnet is a cylindrical or cylindrical shell magnet having an axis of rotational symmetry which is perpendicular to the parallel faces thereof;
wherein the direction of the magnetic moment of said first magnet is perpendicular to said axis of rotational symmetry, wherein said first magnet is attached to said third pivot;
wherein the third axis of rotation and the axis of rotational symmetry of said first magnet are aligned and wherein there is a distance d2 between said first sensor unit and said first magnet, and wherein:
d1 is between 0.1 mm and 10 mm, and
d2 is between 0.01 mm and 10 mm,
wherein the first pivot is for attachment to a lower linkage unit which is attached to said bicycle frame, and the third pivot is for attachment to said bicycle frame.

The present invention also relates to a bicycle suspension system comprising the rear suspension device, as described herein, in combination with a front suspension device for a bicycle and an electronic circuit.

Figure 7:
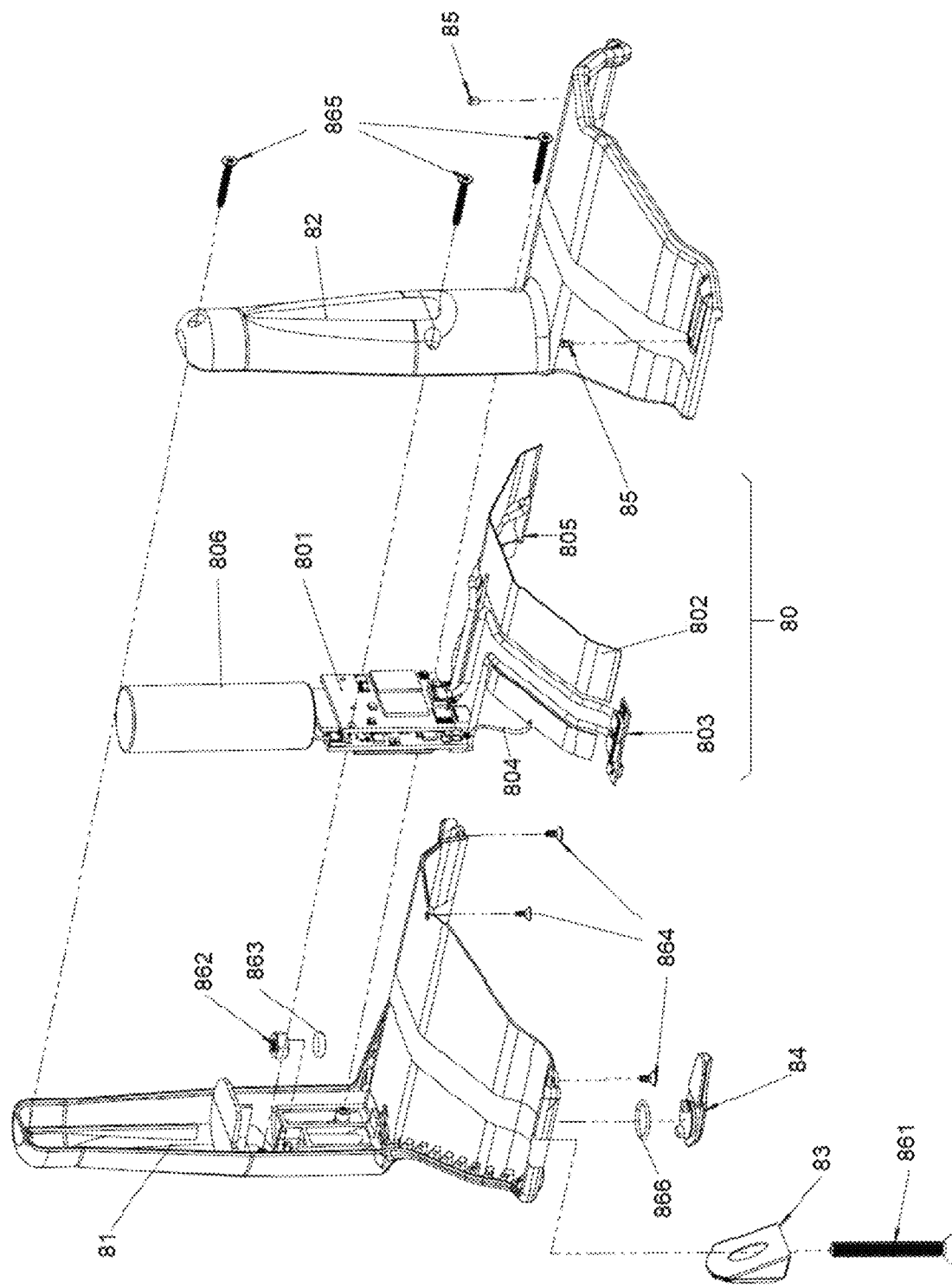
FIG. 7. Exploded perspective partial view of the main board (8) of an embodiment of the bicycle suspension system of the present invention showing: main board base capsule (81), main board cap capsule (82), main board wedge (83), main board USB cap (84), main board LED lenses (85), main board attachment means and o-rings (861 to 865) and circuit (80, partially), including the main board (801), antennae (802), fork board (803), cables (804), LED board (805) and battery (806).

Said electronic circuit (80) is preferably a circuit comprising a processor. Changes in the magnetic flux density which are detected by the sensor units are converted into linear outputs, preferably changes in voltage. Said linear outputs are more preferably converted by said processor into an output. Said output allows the user to determine whether any given suspension device (front and/or rear) is correctly adjusted. Said circuit may also comprise a wireless network. Preferably said circuit is comprised in the sensor unit(s) and/or in the main board, and optionally comprises a wireless network. One embodiment of part of the circuit (80) is shown in the main board (8) in FIG. 7.

Said front suspension device comprises:
(a) a second axial compression shock absorber;
(b) a second sensor unit; and
(c) a second magnet.

Said second axial compression shock absorber comprises a first end and a second end. Preferably, said second axial compression shock absorber comprises the same features (but not the same dimensions) as the first axial compression shock absorber described herein.

Figure 8:
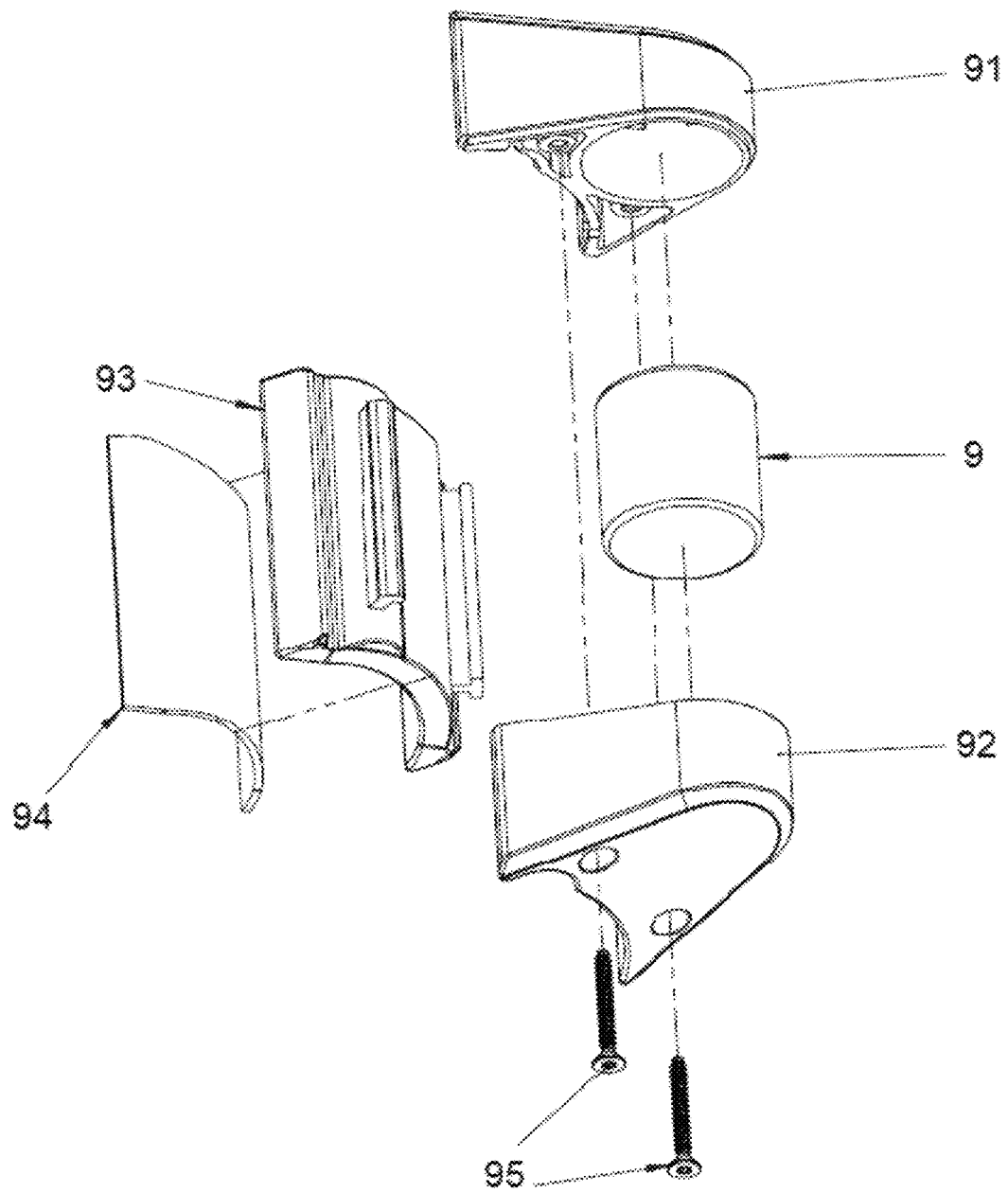
FIG. 8. Exploded perspective partial view of the second magnet (9) and associated housing of an embodiment of the bicycle suspension system of the present invention showing: second magnet capsule cap (91), second magnet capsule base (92), second magnet supplement (93), second magnet adhesive (94) and second magnet screws (95).

Said second magnet is:
a cylindrical magnet having a rotational axis of symmetry which is perpendicular to the parallel faces thereof; or
a prism-shaped magnet comprising two polygonal parallel faces and an axis of rotational symmetry which is perpendicular to said parallel faces;
wherein the direction of the magnetic moment of said second magnet is parallel to said axis of rotational symmetry. Thus, the north pole and south pole of said second magnet are separated by a plane perpendicular to said axis of rotational symmetry and said magnet may be referred to as axially magnetized. Preferably, said second magnet is a cylindrical magnet. One embodiment of the second magnet (9) is shown as part of the second magnet housing in FIG. 8.

Said second sensor unit comprises a magnetic flux sensor. Said magnetic flux sensor is preferably a sensor selected from the group consisting of a Hall-effect sensor, a magneto-diode, a magneto-transistor, an AMR magnetometer, a GMR magnetometer, a magnetic tunnel junction magnetometer, a magneto-optical sensor, a Lorentz force based MEMS sensor, an Electron Tunneling based MEMS sensor, a MEMS compass, a nuclear precession magnetic field sensor, an optically pumped magnetic field sensor, a fluxgate magnetometer, a search coil magnetic field sensor and a SQUID magnetometer. More preferably, said magnetic flux sensor is a Hall-effect sensor, a magneto-diode, a magneto-transistor, an AMR magnetometer or a GMR magnetometer, and the change in the magnetic flux density is measured as a change in voltage, current or resistance, preferably voltage, which is used to calculate the relative displacement of said magnetic flux sensor from said second magnet, In an exemplified preferred embodiment of the present invention, said second sensor unit is an AD22151 Linear Output Magnetic Field Sensor furnished by Analog Devices, Inc.

Said second sensor unit is located on the second end of said second shock absorber, and said second magnet is located on said first end of said second shock absorber, wherein said magnetic flux sensor and the rotational axis of symmetry of said second magnet are aligned.

Thus, in a preferred embodiment of the bicycle suspension system of the present invention, said front suspension device comprises:
(a) a second axial compression shock absorber;
(b) a second sensor unit; and
(c) a second magnet,
wherein
    said second axial compression shock absorber comprises a first end and a second end;
    said second magnet is:
        a cylindrical magnet having a rotational axis of symmetry which is perpendicular to the parallel faces thereof; or
        a prism-shaped magnet comprising two polygonal parallel faces and an axis of rotational symmetry which is perpendicular to said parallel faces;
    wherein the direction of the magnetic moment of said second magnet is parallel to said axis of rotational symmetry, wherein said second magnet is located on said first end of said second shock absorber; and
    said second sensor unit comprises a magnetic flux sensor located on the second end of said second shock absorber,
    wherein said magnetic flux sensor and the rotational axis of symmetry of said second magnet are aligned.

The present invention also relates to a bicycle comprising the rear suspension device of the present invention, as described herein, or the bicycle suspension system of the present invention, as described herein. Said bicycle may be selected from any of the aforementioned bicycles and configured with said rear suspension device or said bicycle suspension system The rear suspension device of the present invention, as described herein, when installed in a bicycle, measures the angle of rotation of the first sensor unit relative to the magnet when said rear suspension device is subject to a load. A load is applied while said bicycle is in use, in particular when the user is mounted on said bicycle. By measuring the angle of rotation in this way, it is possible to very accurately determine the distance of the path through which the rear axle of the rear wheel of the bicycle travels. Due to the diversity of rear suspension types (as mentioned above) and bicycles that are available on the market, the path (coupler curve) through which the rear axle of the rear wheel of the bicycle travels is usually a complex curve, rendering accurate measurement of the distance of the path through which the rear axle of the rear wheel of the bicycle travels very difficult. However, the rear suspension device of the present invention permits accurate measurement of this distance. Accordingly, the rear suspension device of the present invention can be used to determine whether the suspension of the bicycle is correctly adjusted for the user.

Figure 9:
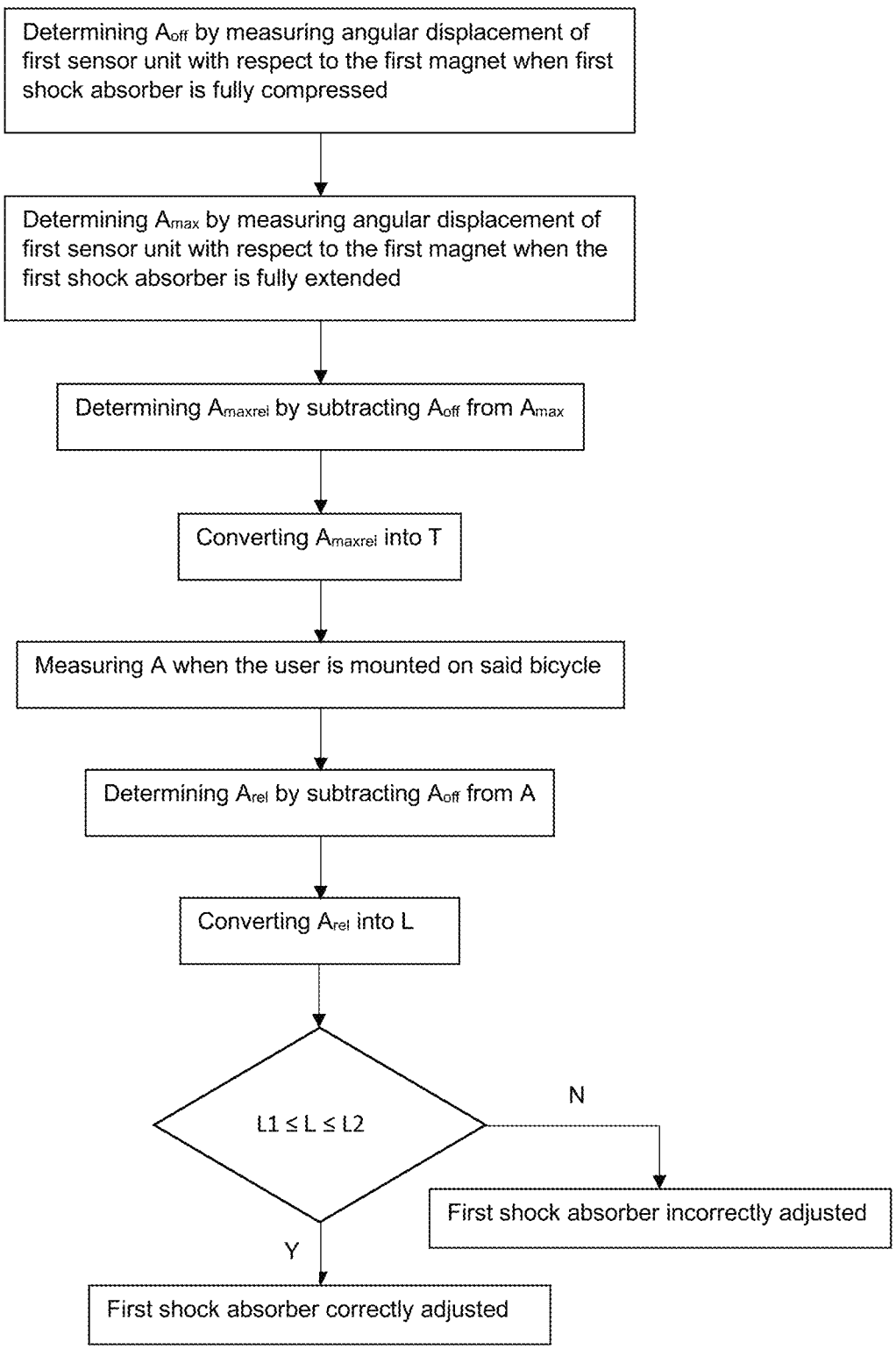
FIG. 9. Flow chart of the method for classifying the first shock absorber of a rear suspension device as correctly or incorrectly adjusted for the user according to the present invention.

Thus, the present invention also relates to a method for classifying the first shock absorber of a rear suspension device of the present invention, as described herein, in a bicycle, as correctly or incorrectly adjusted for the user (FIG. 9). Said method comprises the following steps:
(a) determining the offset angle, $A_{off}$, by measuring the angular displacement of the first sensor unit with respect to the first magnet when the first axial compression shock absorber comprised in the rear suspension device, is fully compressed;
(b) determining the maximum angular displacement, $A_{max}$, by measuring the angular displacement of the first sensor unit with respect to the first magnet when the first shock absorber is fully extended;
(c) determining the relative maximum angular displacement, $A_{maxrel}$, by subtracting the offset angle, $A_{off}$, determined in step (a) from the maximum angular displacement, $A_{max}$, measured in step (b);
(d) converting the relative maximum angular displacement, $A_{maxrel}$, into a total travel distance, T; and
(e) measuring the angular displacement, A, of the first sensor unit with respect to the first magnet when the user is mounted on said bicycle;
(f) determining the relative angular displacement, $A_{rel}$, by subtracting the offset angle, $A_{off}$, determined in step (a) from the angular displacement, A, measured in step (e);
(g) converting the relative angular displacement, $A_{rel}$, into a linear displacement value, L;
(h) classifying said first shock absorber as:
    incorrectly adjusted for said user when L is less than a value L1 or greater than a value L2; or
    correctly adjusted for said user when L is between L1 and L2,
wherein:
    L is the linear displacement, $L_{axle}$, of the rear axle of the bicycle;
    T is the total travel distance, $T_{axle}$, of the rear axle of the bicycle;
    L1 is a value selected from between 10% and 50% of $T_{axle}$; and
    L2 is a value selected from between 20% and 50% of $T_{axle}$,
or wherein
    L is the linear displacement, $L_{shock}$, of the first shock absorber;
    T is the total travel distance, $T_{shock}$, of the first shock absorber;
    L1 is a value selected from between 10% and 50% of $T_{shock}$; and
    L2 is a value selected from between 20% and 50% of $T_{shock}$,
and wherein L1 is at least 0.1% less than L2.

Said method may also be for classifying the first shock absorber of a rear suspension device of the present invention, as described herein, in a bicycle, as correctly or incorrectly adjusted for the user and the terrain, when steps (e) to (g) are repeated w times while moving over said terrain, to obtain w values for L which are averaged to obtain a new value for L which is either the average linear displacement, $L_{axleav}$ of the first shock absorber, or the linear displacement, $L_{shockav}$, of the first shock absorber, When L is between L1 and L2, L is greater than or equal to L1 and less than or equal to L2. Preferably, L1 is at least 0.5% less than L2, more preferably L1 is at least 1% less than L2, even more preferably L1 is at least 2% less than L2. In a preferred embodiment of the method of the present invention:

L is the linear displacement, $L_{axle}$, of the rear axle of the bicycle;

T is the total travel distance, $T_{axle}$, of the rear axle of the bicycle;

L1 is a value selected from between 20% and 34% of $T_{axle}$, and

L2 is a value selected from between 21% and 35% of $T_{axle}$, or wherein

L is the linear displacement, $L_{shock}$, of the first shock absorber;

T is the total travel distance, $T_{shock}$, of the first shock absorber;

L1 is a value selected from between 20% and 34% of $T_{shock}$, and

L2 is a value selected from between 21% and 35% of $T_{shock}$, and wherein L1 is at least 1% less than L2.

Preferably, steps (a) to (d) are only performed once, following installation of the rear suspension device of the present invention, as described herein, in a bicycle. The information obtained from these steps may be used multiple times, each time that steps (e) to (h) are repeated, for example when the user remounts the bicycle or when a different user mounts the bicycle. More preferably, steps (e) to (h) are repeated every q hours that the user is mounted on the bicycle, wherein q is selected from 1 to 240, preferably from 2 to 72, more preferably from 3 to 12. Even more preferably, steps (e) to (h) are repeated every p days, wherein p is selected from 1 to 10, preferably from 2 to 5.

In a preferred embodiment of the method of the present invention, the angular displacement is measured as a function of the voltage measured in the first sensor unit. In another more preferred embodiment of the method of the present invention, the angular displacement, A, of the first sensor unit with respect to the first magnet is measured when only one brake is applied.

In a preferred embodiment of the method of the present invention, steps (c), (d), (f) and (g) are carried out using the electronic circuit, optionally in conjunction with a network connected wirelessly thereto. As mentioned above, said electronic circuit is preferably a circuit comprising a processor. More preferably, changes in the magnetic flux density which are detected by a sensor unit are converted into a linear output (preferably changes in voltage) by said processor. Said output allows the user to determine whether any given suspension device (front and/or rear) is correctly adjusted.

Steps (d) and (g) of converting the relative maximum angular displacement, $A_{maxrel}$, into a total travel distance, T, and converting the relative angular displacement, $A_{rel}$, into a linear displacement value, L, respectively, comprise a mathematical calculation. Said mathematical calculation may use, for example, trigonometric calculation, geometric calculation and/or calculus to convert each of said relative angular displacements into respective distances. Said mathematical calculation may take into account the length of the linkage unit(s) and length of the seat-stay and/or chain-stay and, where relevant, the length of the remaining rear triangle nearest to the seat tube.

Said processor may be that of a general-purpose computer, special purpose computer, or other programmable data processing apparatus to produce a machine, such that the instructions, which execute via the processor of the circuit, create means for implementing the functions/acts specified in the flowchart and/or block diagram block or blocks. Said instructions may also be stored in a computer readable storage medium that can direct a processor and/or other devices to function in a particular manner, such that the computer readable storage medium having instructions stored therein comprises an article of manufacture including instructions which implement aspects of the function/act specified in the flowchart and/or block diagram block or blocks.

The instructions may also be loaded onto a processor, a computer, other programmable data processing apparatus, or other device to cause a series of operational steps to be respectively performed on said processor, computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of the device, system and method according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
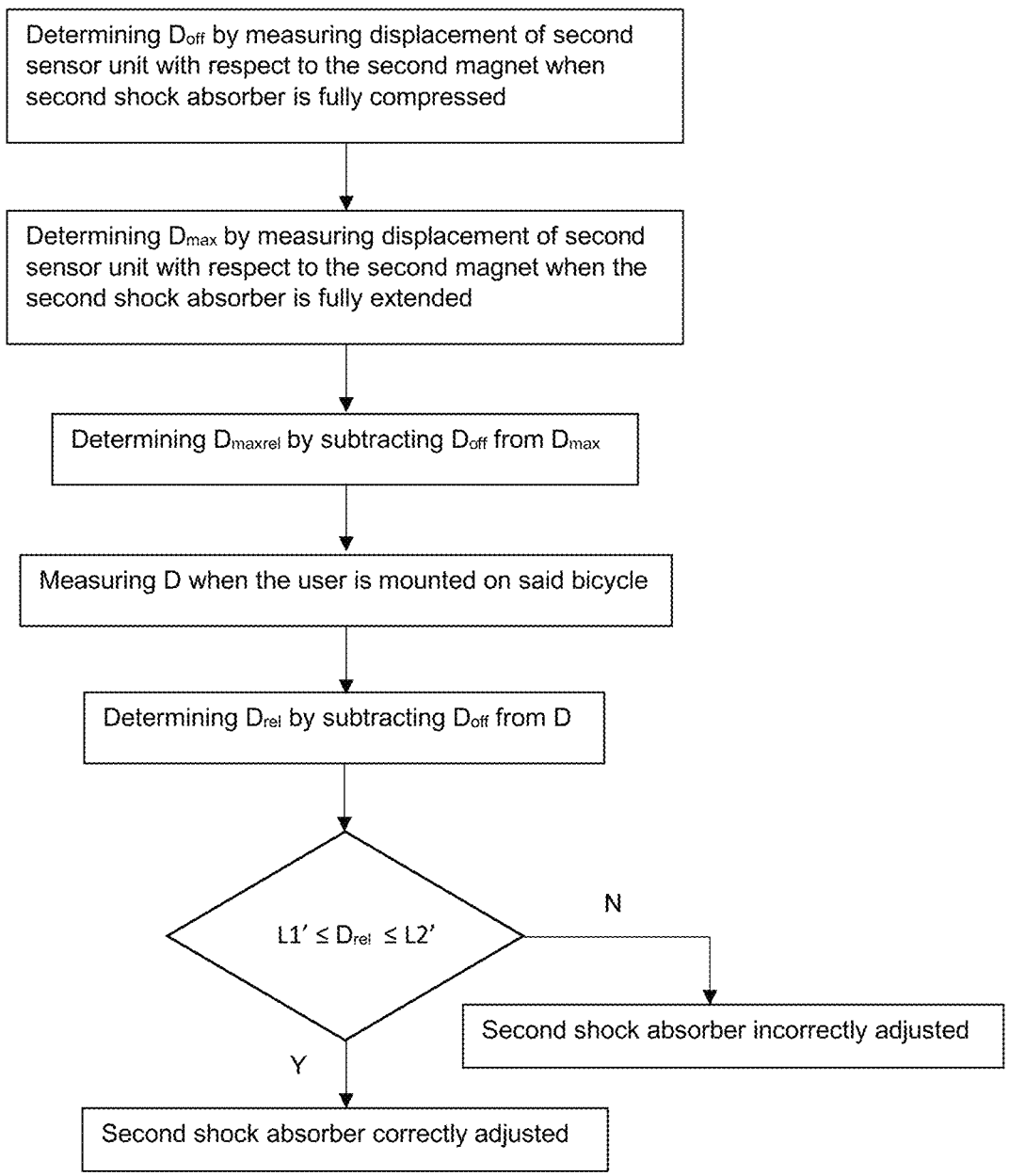
FIG. 10. Flow chart of the method for classifying the second shock absorber of a front suspension device as correctly or incorrectly adjusted for the user according to the present invention.

In a preferred embodiment of the method of the present invention, the method is additionally for classifying the second axial compression shock absorber of a front suspension device as correctly or incorrectly adjusted for the user (FIG. 10), wherein said method comprises the following steps:

(a') determining the offset distance, $D_{off}$ by measuring the displacement of the second sensor unit with respect to the second magnet when the second axial compression shock absorber comprised in the front suspension device, is fully compressed;

(b') determining the maximum displacement, $D_{max}$, by measuring the displacement of the second sensor unit with respect to the second magnet when the second shock absorber is fully extended;

(c') determining the relative maximum displacement, $D_{maxrel}$, by subtracting the offset distance, $D_{off}$, determined in step (a') from the maximum displacement, $D_{max}$, measured in step (b');

(d') measuring the displacement, D, of the second sensor unit with respect to the second magnet when the user is mounted on said bicycle;

(e') determining the relative displacement, $D_{rel}$, by subtracting the offset distance, $D_{off}$, determined in step (a') from the displacement, D, measured in step (d');

(f') classifying said second shock absorber as:
  incorrectly adjusted for said user when $D_{rel}$ is less than a value L1' or greater than a value L2'; or
  correctly adjusted for said user when $D_{rel}$ is between L1' and L2', wherein:
  L1' is a value selected from between 10% and 50% of $D_{maxrel}$; and
  L2' is a value selected from between 20% and 50% of $D_{maxrel}$;
  and wherein L1' is at least 0.1% less than L2'.

When $D_{rel}$ is between L1' and L2', $D_{rel}$ is greater than or equal to L1' and less than or equal to L2'. Preferably, L1' is at least 0.5% less than L2', more preferably L1' is at least 1% less than L2', even more preferably L1' is at least 2% less than L2'. In a preferred embodiment of the method of the present invention:
  L1' is a value selected from between 20% and 39% of $D_{maxrel}$; and
  L2' is a value selected from between 21% and 40% of $D_{maxrel}$.

Preferably, steps (a') to (C) are only performed once, following installation of the bicycle suspension system of the present invention, as described herein, in a bicycle. More preferably, steps (a') to (c') are performed when steps (a) to (d) are performed. The information obtained from these steps may be used multiple times, each time that steps (d') to (f') are repeated. Preferably, steps (d') to (f) are repeated every time that steps (e) to (h) are repeated, as described above.

Preferably, when said first shock absorber and/or said second shock absorber is correctly or incorrectly adjusted for the user, said method informs the user accordingly. The user may be informed that the first shock absorber is classified as correctly adjusted for said user by, for example a light or LED of a given colour (e.g. green) or intensity, or by a display on a screen. Similarly, the user may be informed that the first shock absorber is classified as incorrectly adjusted for said user by, for example a light or LED of a colour different to that of said given colour, or by a display on a screen.

Figure 11:
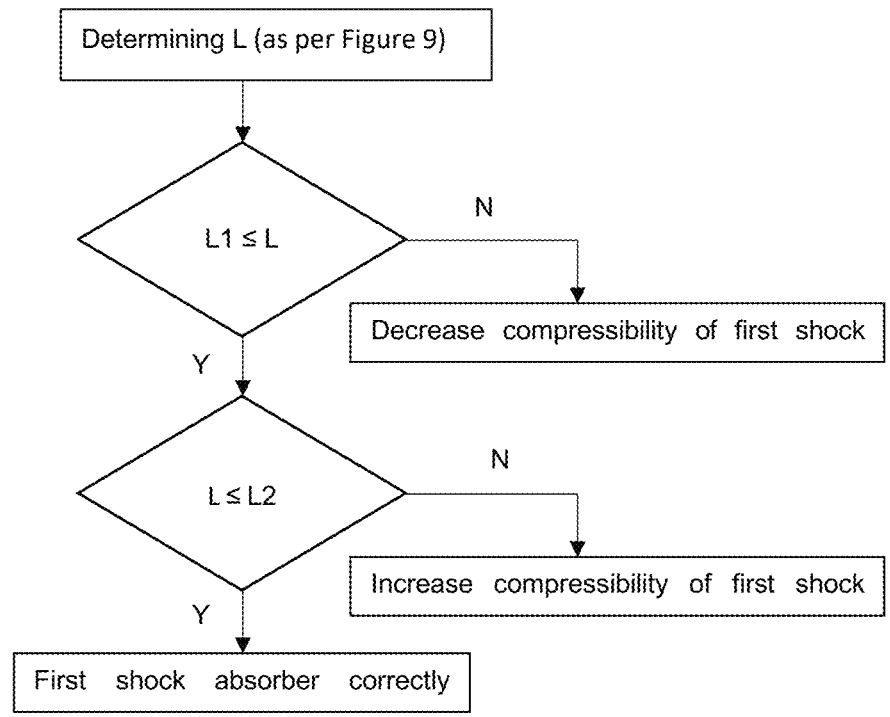
FIG. 11. Flow chart of the method for informing the user whether: A. the first shock absorber of a rear suspension device is correctly or incorrectly adjusted for the user or not and if not, whether to increase or decrease the compressibility of said first shock absorber in order to achieve correct adjustment, and B. the second shock absorber of a front suspension device is correctly or incorrectly adjusted for the user or not and if not, whether to increase or decrease the compressibility of said second shock absorber in order to achieve correct adjustment.
Figure 11:
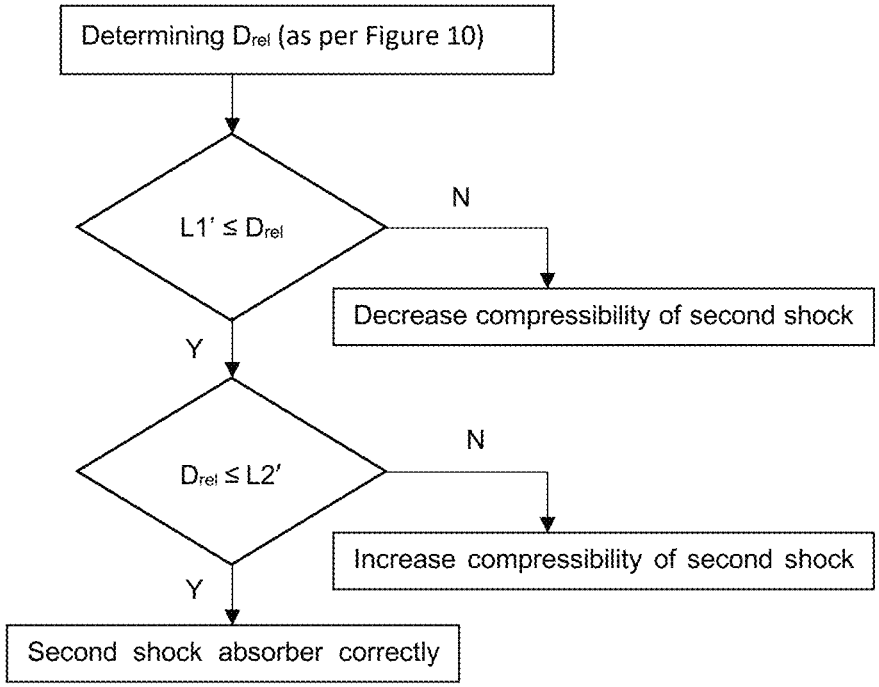

In a preferred embodiment of the method of the present invention, when said first shock absorber and/or said second shock absorber is incorrectly adjusted for the user, said method informs the user how to adjust said first shock absorber and/or said second shock absorber, respectively, wherein when:
  L is less than L1, the user is informed to decrease the compressibility of the first shock absorber (FIG. 11A),
  L is greater than L2, the user is informed to increase the compressibility of the first shock absorber (FIG. 11A),
  $D_{rel}$ is less than L1', the user is informed to decrease the compressibility of the second shock absorber (FIG. 11B), and/or
  $D_{rel}$ is greater than L2', the user is informed to increase the compressibility of the second shock absorber (FIG. 11B).

When the user is informed to decrease the compressibility of a given shock absorber, the sag is considered insufficient. Conversely, when the user is informed to increase the compressibility of a given shock absorber, the sag is considered excessive. A decrease or increase in the compressibility of a shock absorber may be achieved according to the instructions associated with said shock absorber.

The user may be informed to decrease the compressibility of a given shock absorber by, for example, a light or LED of a particular colour (e.g. red), or by a display on a screen. Similarly, the user may be informed to increase the compressibility of a given shock absorber by, for example, a light or LED of a colour (e.g. yellow) different to that of said particular colour, or by a display on a screen. In the examples below, a rear suspension device which is classified as correctly adjusted for said user is assigned a green colour, while a rear suspension device which is classified as incorrectly adjusted for said user and:
  for which the user is informed to decrease the compressibility of the first shock absorber is assigned a red colour; and
  for which the user is informed to increase the compressibility of the first shock absorber is assigned a yellow colour.

EXAMPLES

Example 1: Rear suspension device of the present invention, located in situ in a MDFYC (Foxy Carbon) bicycle frame (cf. FIG. 2).

In FIG. 2, the front suspension device includes a second axial compression shock absorber, a magnetic flux sensor, AD22151 (803) located in one side of the casing of the main board (7), that is aligned with a cylindrical second magnet (9), attached to one end of the second shock absorber, so that when the suspension moves axially, the relative movement between the magnet (9) and the magnetic flux sensor (803) generates a change in voltage that is detected in said sensor.

In FIG. 2, the rear suspension device includes an first axial compression shock absorber (7) floating in a multi-pivot Zero suspension configuration that compresses it from both ends upon upward displacement of the rear axle of the bicycle relative to the frame. The first shock absorber (7) is attached by one end to a first pivot (1) and by the other end to a second pivot (2), each of them having an axis of rotation which is parallel to the other. A linkage unit (6) is also attached to said second pivot (2), as well as to a third pivot (3) which, in turn is attached to the frame of said bicycle, and a fourth pivot (4) which in turn is attached to the seat stay of the rear triangle of the bicycle. Said linkage unit (6) rotates about the second, third, and fourth axes of rotation upon application of a load (force) to the rear wheel of the bicycle that causes the rear axle of the bicycle to be displaced upward or downward relative to the frame. The first sensor unit, AS5600 (5), which is attached to the surface of the linkage unit (6), comprises a Bluetooth module, electronic devices and four Hall-effect sensors to detect the rotational movement of said first sensor unit (5) relative to the diametrically magnetized cylindrical first magnet (10) that is embedded inside a cylindrical cavity of a hexagonal bushing that in turn is inserted into the hexagonal cavity of the third pivot (3) so that the surface of said magnet that is closest to said sensor unit is flush with the end surface of said third pivot (3), wherein the distance d2 between said first sensor unit and said first magnet is less than 3 mm, and the distance d1 of the Hall-effect sensors from said third axis of rotation is less than or equal to the radius of the parallel faces of said first magnet. Said rotational movement of said first sensor unit (5) relative to said first magnet (10) generates a change in voltage that is detected in said sensor.

The total travel distance, $T_{axle}$ of the bicycle is 153.93 mm, over which the first shock absorber travels 64.43 mm. Measurement of the rotational angle (relative angular displacement, $A_{rel}$) through which the first sensor unit (5) moves relative to said first magnet (10) (i.e. through which the linkage unit moves relative to the bicycle frame) was performed over this range, as shown in Table 1.

TABLE 1

Measurements made using a rear suspension device of the invention located in situ in a MDFYC (Foxy Carbon) bicycle frame

| $A_{rel}$ (degrees) | $L_{axle}$ (mm) | Travel of rear axle (%) | $L_{shock}$ (mm) | Travel of first shock absorber (%) |
|---|---|---|---|---|
| 0.000 | 0.00 | 0% | 0.00 | 0% |
| ... | ... | ... | ... | ... |
| 12.407 | 40.24 | 26% | −16.36 | 25% |
| 12.501 | 40.53 | 26% | −16.48 | 26% |
| 12.594 | 40.81 | 27% | −16.60 | 26% |
| 12.688 | 41.10 | 27% | −16.72 | 26% |
| 12.781 | 41.39 | 27% | −16.85 | 26% |
| ... | ... | ... | ... | ... |
| 15.880 | 50.89 | 33% | −20.87 | 32% |
| 15.974 | 51.17 | 33% | −20.99 | 33% |
| 16.068 | 51.46 | 33% | −21.11 | 33% |
| 16.163 | 51.74 | 34% | −21.24 | 33% |
| 16.257 | 52.03 | 34% | −21.36 | 33% |
| ... | | | | |
| 52.949 | 153.94 | 100% | −64.43 | 100% |

The entries of Table 1 in the rows with Arel values of 12.594-16.068) represent those for which the first shock absorber was considered correctly adjusted for the user (indicated by a green light on a display). The entries above those shaded grey represent those for which the compressibility of the first shock absorber should be decreased (indicated by a red light on a display), while the entries below those shaded grey represent those for which the compressibility of the first shock absorber should be increased (indicated by a yellow light on a display).

Example 2: Rear suspension device of the present invention, located in situ in a Crafty Carbon bicycle frame (cf. FIG. 3).

In FIG. 3, the front suspension device includes the same second axial compression shock absorber, magnetic flux sensor, AD22151 (803), main board (7), and cylindrical second magnet (9), as in FIG. 2.

In FIG. 3, the rear suspension device includes an first axial compression shock absorber (7) floating in a multi-pivot Zero suspension configuration that compresses it from both ends upon upward displacement of the rear axle of the bicycle relative to the frame. The first shock absorber (7) is attached by one end to a first pivot (1, hidden) and by the other end to a second pivot (2), each of them having an axis of rotation which is parallel to the other. A linkage unit (6) is also attached to said second pivot (2), as well as to a third pivot (3) which, in turn is attached to the frame of said bicycle, and a fourth pivot (4) which in turn is attached to the seat stay of the rear triangle of the bicycle. Said linkage unit (6) rotates about the second, third, and fourth axes of rotation upon application of a load (force) to the rear wheel of the bicycle that causes the rear axle of the bicycle to be displaced upward or downward relative to the frame. The first sensor unit, AS5600 (5), which is attached to the surface of the linkage unit (6) detects the rotational movement of said first sensor unit (5) relative to the diametrically magnetized cylindrical first magnet (10) that is inserted into the hexagonal cavity of the third pivot (3) so that the surface of said magnet that is closest to said sensor unit is flush with the end surface of said third pivot (3), wherein the distance d2 between said first sensor unit and said first magnet is less than 3 mm, and the distance d1 of the Hall-effect sensors of the first sensor unit (5) from said third axis of rotation is less than or equal to the radius of the parallel faces of said first magnet. Said rotational movement of said first sensor unit (5) relative to said first magnet (10) generates a change in voltage that is detected in said sensor.

The total travel distance, $T_{axle}$ of the bicycle is 150.01 mm, over which the first shock absorber travels 65 mm. Measurement of the rotational angle (relative angular displacement, $A_{rel}$) through which the first sensor unit (5) moves relative to said first magnet (10) (i.e. through which the linkage unit moves relative to the bicycle frame) was performed over this range, as shown in Table 2.

The entries of Table 2 in the rows with Arel values of 15.676-19.444 represent those for which the first shock absorber was considered correctly adjusted for the user (indicated by a green light on a display). The entries above those rows (less than Arel 15.676) represent those for which the compressibility of the first shock absorber should be decreased (indicated by a red light on a display), while the entries below those rows (above Arel 19.444 represent those for which the compressibility of the first shock absorber should be increased (indicated by a yellow light on a display).

In both Examples 1 and 2, the precision in measurement of the travel of the rear axle is less than 0.3 mm, whereas if this were to be estimated based on travel of the first shock absorber, the precision would be greatly reduced.

TABLE 2

Measurements made using a rear suspension device of the invention located in situ in a Crafty Carbon bicycle frame

| $A_{rel}$ (degrees) | $L_{axle}$ (mm) | Travel of rear axle (%) | $L_{shock}$ (mm) | Travel of first shock absorber (%) |
|---|---|---|---|---|
| 0.000 | 0.00 | 0% | 0.00 | 0% |
| ... | ... | ... | ... | ... |
| 15.404 | 44.00 | 29% | 17.058 | 26% |
| 15.540 | 44.38 | 30% | 17.214 | 26% |
| 15.676 | 44.77 | 30% | 17.369 | 27% |
| 15.812 | 45.15 | 30% | 17.526 | 27% |
| 15.949 | 45.53 | 30% | 17.683 | 27% |
| ... | ... | ... | ... | ... |
| 19.159 | 54.54 | 36% | 21.386 | 33% |
| 19.301 | 54.94 | 37% | 21.551 | 33% |
| 19.444 | 55.34 | 37% | 21.716 | 33% |
| 19.586 | 55.73 | 37% | 21.881 | 34% |
| 19.729 | 56.13 | 37% | 22.047 | 34% |
| ... | | | | |
| 56.307 | 150.01 | 100% | 64.997 | 100% |

The invention claimed is:

1. Rear suspension device for a bicycle, wherein said device comprises:
    (a) a first pivot having a first axis of rotation, a second pivot having a second axis of rotation, and a third pivot having a third axis of rotation;
    (b) a first axial compression shock absorber;
    (c) a linkage unit;
    (d) a first sensor unit; and
    (e) a first magnet
    wherein
        said first axis of rotation, said second axis of rotation and said third axis of rotation are parallel;

said first axial compression shock absorber comprises a first end and a second end, wherein said first end is attached to said first pivot and said second end is attached to said second pivot; and said linkage unit is attached to said second pivot and said third pivot and rotates about said second axis of rotation and said third axis of rotation; characterized in that said first sensor unit is located on a surface of said linkage unit and comprises at least one Hall-effect sensor located in a plane perpendicular to the third axis of rotation, wherein each Hall-effect sensor is located at a distance d1 from said third axis of rotation;

said first magnet is:
- a cylindrical or cylindrical shell magnet having an axis of rotational symmetry which is perpendicular to the parallel faces thereof; or
- a prism-shaped magnet comprising two polygonal parallel faces and an axis of rotational symmetry which is perpendicular to said parallel faces;

wherein the direction of the magnetic moment of said first magnet is perpendicular to said axis of rotational symmetry, wherein said first magnet is attached to said third pivot;

wherein there is a distance d2 between said first sensor unit and said first magnet, and wherein:

d1 is between 0.1 mm and 50 mm; and d2 is between 0.01 mm and 50 mm the third axis of rotation and the axis of rotational symmetry of said first magnet are aligned; and said first magnet is embedded in said third pivot, and the face of said magnet which is closest to said first sensor unit is flush with the end surface of said third pivot.

2. The rear suspension device according to claim 1, wherein the distance d1 is less than or equal to the longest dimension of the parallel faces of said first magnet and the distance d2 between said sensor unit and said magnet is less than 5 mm.

3. The rear suspension device according to claim 1, wherein said first end of first axial compression shock absorber is attached to said first pivot and rotates about said first axis of rotation, and said second end of first axial compression shock absorber is attached to said second pivot and rotates about said second axis of rotation.

4. A bicycle comprising the rear suspension device according to claim 1.

5. The rear suspension device according to claim 1, wherein said linkage unit additionally comprises a fourth pivot having a fourth axis of rotation parallel to said first axis of rotation, said second axis of rotation and said third axis of rotation, and said linkage unit is additionally attached to and rotates about said fourth pivot.

6. The rear suspension device according to claim 5, wherein:
said first and third pivots are for directly or indirectly attaching to the frame of said bicycle; and
said fourth pivot is for directly or indirectly attaching to the rear wheel of said bicycle.

7. A bicycle suspension system comprising the rear suspension device according to claim 1 in combination with a front suspension device for a bicycle and an electronic circuit, wherein said electronic circuit monitors the displacement measured by said rear suspension device and said front suspension device.

8. A bicycle suspension system according to claim 7, wherein said front suspension device comprises:

(a) a second axial compression shock absorber;
(b) a second sensor unit; and
(c) a second magnet,
wherein
said second axial compression shock absorber comprises a first end and a second end;
said second magnet is:
- a cylindrical magnet having a rotational axis of symmetry which is perpendicular to the parallel faces thereof; or
- a prism-shaped magnet comprising two polygonal parallel faces and an axis of rotational symmetry which is perpendicular to said parallel faces;

wherein the direction of the magnetic moment of said second magnet is parallel to said axis of rotational symmetry, wherein said second magnet is located on said first end of said second shock absorber; and said second sensor unit comprises a magnetic flux sensor located on the second end of said second shock absorber, wherein said magnetic flux sensor and the rotational axis of symmetry of said second magnet are aligned.

9. A method for classifying the first shock absorber of a rear suspension device according to claim 1 in a bicycle, as correctly or incorrectly adjusted for the user, wherein said method comprises the following steps:

(a) determining the offset angle, Aoff, by measuring the angular displacement of the first sensor unit with respect to the first magnet when the first axial compression shock absorber comprised in the rear suspension device, is fully compressed;

(b) determining the maximum angular displacement, Amax, by measuring the angular displacement of the first sensor unit with respect to the first magnet when the first shock absorber is fully extended;

(c) determining the relative maximum angular displacement, Amaxrel, by subtracting the offset angle, Aoff, determined in step (a) from the maximum angular displacement, Amax, measured in step (b);

(d) converting the relative maximum angular displacement, Amaxrel, into a total travel distance, T; and (e) measuring the angular displacement, A, of the first sensor unit with respect to the first magnet when the user is mounted on said bicycle;

(f) determining the relative angular displacement, Arel, by subtracting the offset angle, Aoff, determined in step (a) from the angular displacement, A, measured in step (e);

(g) converting the relative angular displacement, Arel, into a linear displacement value, L;

(h) classifying said first shock absorber as:
incorrectly adjusted for said user when L is less than a value L1 or greater than a value L2; or
correctly adjusted for said user when L is between L1 and L2, wherein:
L is the linear displacement, Laxle, of the rear axle of the bicycle;
T is the total travel distance, Taxle, of the rear axle of the bicycle;
L1 is a value selected from between 10% and 50% of Taxle; and
L2 is a value selected from between 20% and 50% of Taxle, or wherein
L is the linear displacement, Lshock, of the first shock absorber;

T is the total travel distance, Tshock, of the first shock absorber;

L1 is a value selected from between 10% and 50% of Tshock; and

L2 is a value selected from between 20% and 50% of Tshock, and wherein L1 is at least 0.1% less than L2.

10. The method according to claim 9, wherein the angular displacement, A, of the first sensor unit with respect to the first magnet is measured when only one brake is applied.

11. The method according to claim 9, wherein the method is additionally for classifying the second axial compression shock absorber of a front suspension device as correctly or incorrectly adjusted for the user, wherein said method comprises the following steps:
- (a') determining the offset distance, Doff, by measuring the displacement of the second sensor unit with respect to the second magnet when the second axial compression shock absorber comprised in the front suspension device, is fully compressed;
- (b') determining the maximum displacement, Dmax, by measuring the displacement of the second sensor unit with respect to the second magnet when the second shock absorber is fully extended;
- (c') determining the relative maximum displacement, Dmaxrel, by subtracting the offset distance, Doff, determined in step (a') from the maximum displacement, Dmax, measured in step (b');
- (d') measuring the displacement, D, of the second sensor unit with respect to the second magnet when the user is mounted on said bicycle;
- (e') determining the relative displacement, Drel, by subtracting the offset distance, Doff, determined in step (a') from the displacement, D, measured in step (d');
- (f') classifying said second shock absorber as:
  incorrectly adjusted for said user when Drel is less than a value L1' or greater than a value L2'; or
  correctly adjusted for said user when Drel is between L1' and L2',
  wherein:
  L1' is a value selected from between 10% and 50% of Dmaxrel; and
  L2' is a value selected from between 20% and 50% of Dmaxrel,
  and wherein L1' is at least 0.1% less than L2'.

12. The method according to claim 9, wherein when said first shock absorber and/or said second shock absorber is incorrectly adjusted for the user, said method informs the user how to adjust said first shock absorber and/or said second shock absorber, respectively, wherein when:
- L is less than L1, the user is informed to decrease the compressibility of the first shock absorber;
- L is greater than L2, the user is informed to increase the compressibility of the first shock absorber;
- Drel is less than L1', the user is informed to decrease the compressibility of the second shock absorber; and/or
- Drel is greater than L2', the user is informed to increase the compressibility of the second shock absorber.

13. The method according to claim 9, wherein steps (c), (d), (f) and (g) are carried out using the electronic circuit.

14. The method of claim 13 wherein the electronic circuit has with a network connected wirelessly thereto.

15. The method of claim 13 wherein the method is additionally for classifying the second axial compression shock absorber of a front suspension device as correctly or incorrectly adjusted for the user, wherein said method comprises the following steps:
- (a') determining the offset distance, Doff, by measuring the displacement of the second sensor unit with respect to the second magnet when the second axial compression shock absorber comprised in the front suspension device, is fully compressed;
- (b') determining the maximum displacement, Dmax, by measuring the displacement of the second sensor unit with respect to the second magnet when the second shock absorber is fully extended;
- (c') determining the relative maximum displacement, Dmaxrel, by subtracting the offset distance, Doff, determined in step (a') from the maximum displacement, Dmax, measured in step (b');
- (d') measuring the displacement, D, of the second sensor unit with respect to the second magnet when the user is mounted on said bicycle;
- (e') determining the relative displacement, Drel, by subtracting the offset distance, Doff, determined in step (a') from the displacement, D, measured in step (d');
- (f') classifying said second shock absorber as:
  incorrectly adjusted for said user when Drel is less than a value L1' or greater than a value L2'; or
  correctly adjusted for said user when Drel is between L1' and L2',
  wherein:
  L1' is a value selected from between 10% and 50% of Dmaxrel; and
  L2' is a value selected from between 20% and 50% of Dmaxrel,
  and wherein L1' is at least 0.1% less than L2'.

16. The method according to claim 13, wherein when said first shock absorber and/or said second shock absorber is incorrectly adjusted for the user, said method informs the user how to adjust said first shock absorber and/or said second shock absorber, respectively, wherein when:
- L is less than L1, the user is informed to decrease the compressibility of the first shock absorber;
- L is greater than L2, the user is informed to increase the compressibility of the first shock absorber;
- Drel is less than L1', the user is informed to decrease the compressibility of the second shock absorber; and/or
- Drel is greater than L2', the user is informed to increase the compressibility of the second shock absorber.

17. The method according to claim 9, wherein the angular displacement is measured as a function of the voltage measured in the first sensor unit.

18. The method according to claim 17, wherein the angular displacement, A, of the first sensor unit with respect to the first magnet is measured when only one brake is applied.

* * * * *